(12) United States Patent
Shaffer et al.

(10) Patent No.: US 7,751,545 B2
(45) Date of Patent: Jul. 6, 2010

(54) ENHANCED CALL PICKUP

(75) Inventors: Shmuel Shaffer, Palo Alto, CA (US); Labhesh Patel, Mountain View, CA (US); Shantanu Sarkar, San Jose, CA (US); Cary W. FitzGerald, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1045 days.

(21) Appl. No.: 10/828,998

(22) Filed: Apr. 21, 2004

(65) Prior Publication Data

US 2005/0238157 A1 Oct. 27, 2005

(51) Int. Cl.
*H04M 3/42* (2006.01)

(52) U.S. Cl. .............. 379/211.01; 379/201.04; 379/211.02; 379/212.01; 379/214.01; 379/215.01

(58) Field of Classification Search .......... 379/219, 379/214.01, 201.04, 211.01, 211.02, 212.01, 379/215.01; 455/417
See application file for complete search history.

(56) References Cited

U.S. PATENT DOCUMENTS

| | | | | |
|---|---|---|---|---|
| 4,436,962 A | 3/1984 | Davis et al. | ............ | 179/18 B |
| 4,790,004 A * | 12/1988 | Nalbone | ............ | 379/214.01 |
| 5,073,923 A | 12/1991 | Offers et al. | ............ | 379/165 |
| 5,371,781 A * | 12/1994 | Ardon | ............ | 455/445 |
| 5,815,563 A * | 9/1998 | Ardon | ............ | 379/211.01 |
| 6,195,560 B1 | 2/2001 | Chavez, Jr. | ............ | 455/518 |
| 6,292,672 B1 | 9/2001 | Chavez, Jr. | ............ | 455/519 |
| 6,304,649 B1 * | 10/2001 | Lauzon et al. | ............ | 379/211.01 |
| 6,320,954 B1 | 11/2001 | Wille | ............ | 379/225 |
| 6,363,142 B1 * | 3/2002 | Stumer | ............ | 379/211.01 |
| 6,430,283 B1 | 8/2002 | Wille | ............ | 379/225 |
| 6,498,791 B2 | 12/2002 | Pickett et al. | ............ | 370/353 |
| 2003/0215078 A1 * | 11/2003 | Brahm et al. | ............ | 379/211.02 |
| 2004/0086102 A1 * | 5/2004 | McMurry et al. | ............ | 379/219 |
| 2005/0113077 A1 * | 5/2005 | Bushnell et al. | ............ | 455/417 |

* cited by examiner

*Primary Examiner*—Ahmad F Matar
*Assistant Examiner*—Khai N Nguyen
(74) *Attorney, Agent, or Firm*—Baker Botts L.L.P.

(57) ABSTRACT

In one embodiment, a method for enhanced call pickup includes accessing data indicating a current status of each of one or more users in a call pickup group (CPG) with respect to an incoming phone call to a phone number corresponding to the CPG and communicating the data to one or more endpoints of one or more users in the CPG for display to one or more users in the CPG. A display of the data to a first user in the CPG facilitates the first user determining a current status of each of one or more second users in the CPG to facilitate a decision by the first user regarding whether to pick up the incoming phone call.

32 Claims, 2 Drawing Sheets

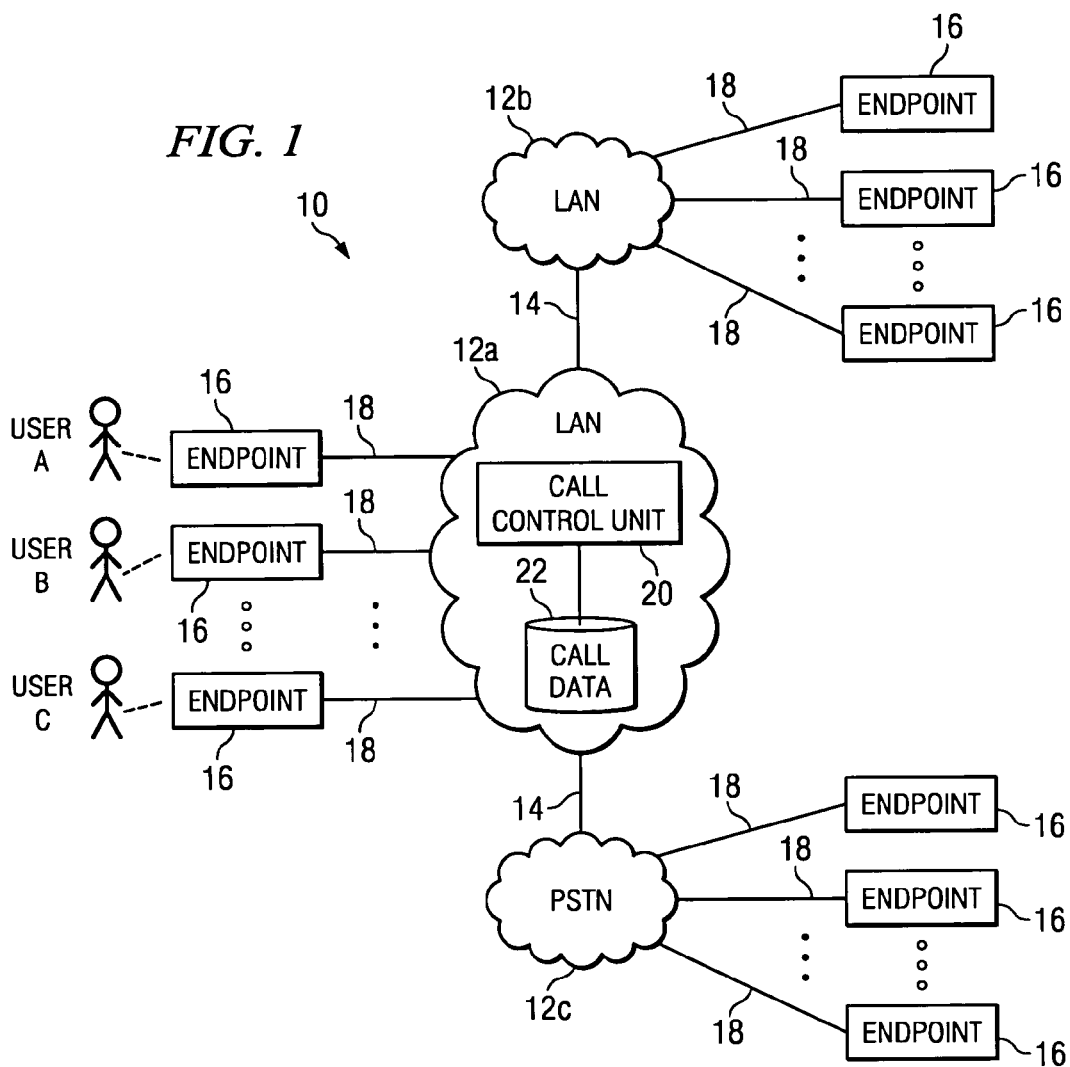

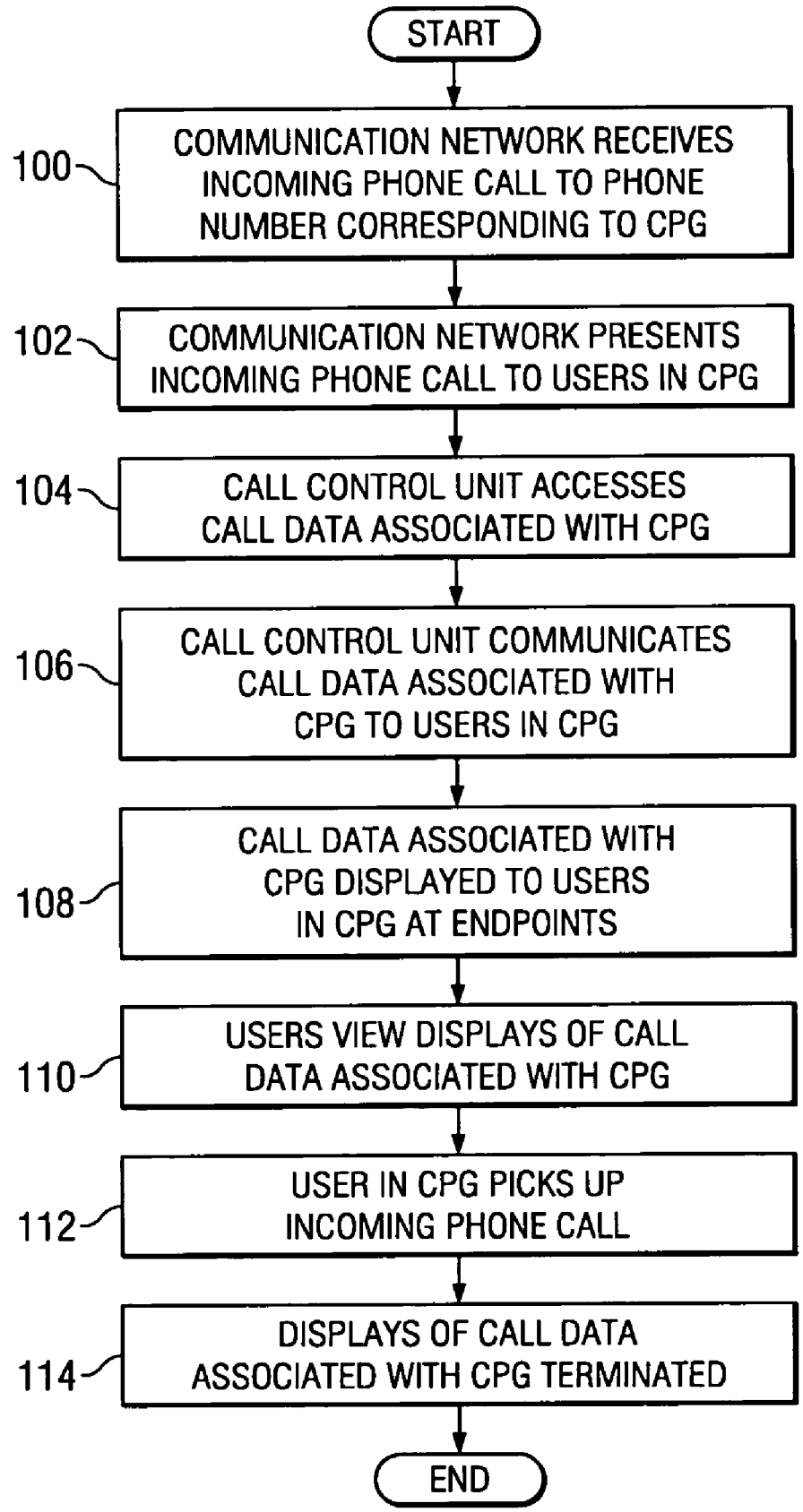

ENHANCED CALL PICKUP

TECHNICAL FIELD OF THE INVENTION

This invention relates generally to communication networks and more particularly to enhanced call pickup.

BACKGROUND

Typical call pickup group (CPG) functionality enables a user in a CPG to answer a phone call received at a phone number of the CPG that is different from a phone number of that user. Such functionality may also enable a first user to redirect an incoming phone call ringing at a phone of a second user to a phone of the first user.

Typical CPG functionality was developed for time division multiplexing (TDM) private branch exchanges (PBXs) directing phone calls to plain old phone service (POTS) phones. Because a typical PBX includes only limited functionality for communication among users in a CPG, when an incoming phone call to a phone number corresponding to the CPG is presented to the CPG for pickup, users in the CPG often have access to only the called phone number and the calling phone number of the incoming phone call.

SUMMARY OF THE INVENTION

According to the present invention, disadvantages and problems associated with call pickup may be reduced or eliminated.

In one embodiment, a method for enhanced call pickup includes accessing data indicating a current status of each of one or more users in a CPG with respect to an incoming phone call to a phone number corresponding to the CPG and communicating the data to one or more endpoints of one or more users in the CPG for display to one or more users in the CPG. A display of the data to a first user in the CPG facilitates the first user determining a current status of each of one or more second users in the CPG to facilitate a decision by the first user regarding whether to pick up the incoming phone call.

Particular embodiments of the present invention may provide one or more technical advantages. As an example, particular embodiments may enable users in a CPG to better communicate with each with respect to an incoming phone call presented to the CPG for pickup. Such communication may facilitate a first user in the CPG determining whether to pick up the incoming phone call or to let a second user in the CPG pick up the incoming phone call. Particular embodiments may, when an incoming phone call is presented to a CPG, identify to a first user in the CPG one or more second users in the CPG and indicate to the first user whether each of the second users is available, a current presence status of each the second users, a current call status of each of the second users, and a willingness of each of one or more of the second users in the CPG to pick up the incoming phone call. Certain embodiments may provide all, some, or none of these technical advantages. Certain embodiments may provide one or more other technical advantages, one or more of which may be readily apparent to those skilled in the art from the figures, descriptions, and claims herein.

BRIEF DESCRIPTION OF THE DRAWINGS

To provide a more complete understanding of the present invention and the features and advantages thereof, reference is made to the following description, taken in conjunction with the accompanying drawings, in which:

FIG. 1 illustrates an example system for enhanced call pickup;

FIG. 2 illustrates an example display of example data associated with a CPG for enhanced call pickup; and FIG. 3 illustrates an example method for enhanced call pickup.

DESCRIPTION OF EXAMPLE EMBODIMENTS

FIG. 1 illustrates an example system 10 for enhanced call pickup in a communication network 12. Communication networks 12*a* and 12*b* are local area networks (LANs). Communication network 12*c* is a public switched telephone network (PSTN). Communication networks 12 are coupled to each other using network links 14 that may each include one or more LANs, wide area networks (WANs), metropolitan area networks (MANs), portions of the Internet, PSTNs, or other network links 14 or a combination of two or more such network links 14. In particular embodiments, a contact admission control (CAC) system is used to monitor bandwidth availability over a WAN coupling two or more communication networks 12 to each other. Although a particular number of particular communication networks 12 coupled to each other according to a particular arrangement are illustrated and described, the present invention contemplates any suitable number of any suitable communication networks 12 coupled to each other according to any suitable arrangement. Although communication networks 12 are illustrated and described as being more or less separate from each other, the present invention also contemplates two or more communication networks 12 being combined with each other in a suitable manner. In addition, a single communication network 12 may encompass multiple communication networks 12. As an example and not by way of limitation, in particular embodiments, a single communication network 12 includes communication networks 12*a*, 12*b*, and 12*c* and network links 14 coupling communication networks 12*a*, 12*b*, and 12*c*, to each other.

One or more portions of a communication network 12 may be associated with a particular enterprise or other organization. Another organization may operate one or more such portions of communication network 12 according to an outsourcing arrangement between the two organizations. In addition, one or more of portions of communication network 12 may include a private communication network 12, a virtual communication network 12, or both. One or more portions of communication network 12 may include one or more trust domains. One or more of portions of communication network 12 may be a distributed communication network 12. A communication network 12 may include one or more network devices. A network device includes one or more hardware components, software components, or embedded-logic components or a combination of two or more such components supporting communication among multiple endpoints 16. As an example and not by way of limitation, a network device may include one or more network components, gatekeepers, contact managers, routers, hubs, switches, gateways, or endpoints 16 or a combination of two or more such devices.

Network devices in a communication network 12 may be coupled to each other according to any suitable arrangement using one or more network segments. As an example and not by way of limitation, network devices in a communication network 12 may be coupled to each other according to a ring, mesh, or other topology using multiple network segments. A network segment may include one or more communication networks 12, computer buses, wireline segments, optical segments, wireless segments, or other segments or a combination of two or more of such segments. Although particular communication networks 12 including particular network devices coupled to each other according to particular arrangements using particular network segments are described, the present invention contemplates any suitable communication networks 12 including any suitable network devices coupled to each other according to any suitable arrangements using any suitable network segments.

Communication networks 12 each have endpoints 16. An endpoint 16 includes one or more hardware components, software components, or embedded-logic components or a combination of two or more such components for communicating with one or more other endpoints 16. As an example and not by way of limitation, an endpoint 16 may include a phone (which may be a mobile phone, a desktop phone, or another phone), a computer (which may be a laptop computer, a desktop computer, or other computer), a personal digital assistant (PDA), a video monitor, a camera, a fax machine, or other device. An endpoint 16 may be coupled to a network device in a communication network 12 using one or more endpoint links 18 that may each include one or more computer buses, LANs, MANs, WANs, or portions of the Internet or any other appropriate wireline, optical, wireless, or other endpoint links 18. Although endpoints 16 coupled to a communication network 12 are illustrated and described as being separate from communication network 12, communication network 12 may include one or more of endpoints 16. Endpoints 16 may communicate with each other using packets of data. A packet may include one or more packets, cells, frames, or other units of data. Data may include one or more data components, metadata components, executable software components, or other components.

Endpoints 16 may use one or more suitable communication protocols to communicate with each other. According to one or more such communication protocols, one or more endpoints 16 may each be identified using a unique address. In addition or as an alternative, one or more network devices may each be identified using a unique address. As an example and not by way of limitation, in particular embodiments, two or more endpoints 16 may each be identified by an Internet Protocol (IP) address and may communicate with each other using IP. In these embodiments, one or more components of system 10 may support point-to-point, multicast, unicast, or other communication. One or more endpoints 16 and network devices may support Voice over IP (VoIP) or Voice over Packet (VoP). To communicate using VoIP or VoP, an endpoint packetizes voice data into packets communicable over one or more packet-based communication networks 12. Endpoints 16 and network devices that may support VoIP or VoP include telephones, fax machines, computers running telephony software, nodes, gateways, and other devices capable of providing telephony functionality over a packet-based communication network 12.

Communication between a first endpoint 16 and one or more second endpoints 16 may include one or more voice components, text components, executable software components, data components, or other components or a combination of two or more such components. As an example and not by way of limitation, a communication between a first endpoint 16 and one or more second endpoints 16 may include one or more instant messages (IMs). One or more endpoints 16 and network devices may support use of Session Initiation Protocol (SIP) for IM and possibly other functionality. In addition or as an alternative, one or more endpoints 16 and network devices may support use of SIP for Instant Messaging and Presence-Leveraging Extensions (SIMPLE) Protocol. In system 10, one or more voice-enabled endpoints 16 may support use of SIP and presence-related applications. In addition or as a further alternative, one or more endpoints 16 and network devices may support use of Instant Messaging and Presence Protocol (IMPP). Reference to "IM" may encompass both IM and one or more IM-related protocols.

A communication network 12 may receive incoming phone calls from first endpoints 16 and route the incoming phone calls to second endpoints 16 coupled to communication network 12. Communication network 12 may route incoming phone calls according to calling phone numbers, called phone numbers, or both. Communication network 12 may also route incoming phone calls to CPGs. A CPG may correspond to one or more phone numbers and may include multiple users. As an example and not by way of limitation, a CPG may include particular users at endpoints 16 coupled to communication network 12. In particular embodiments, when communication network 12 receives an incoming phone call to a phone number corresponding to a CPG, communication network 12 identifies one or more endpoints 16 that one or more users in the CPG are currently present at. Communication network 12 then routes the incoming phone call to endpoints 16 to present the incoming phone call to those users for pickup. Any one of those users may then pick up the incoming phone call. Reference to a "user" may include an endpoint 16, a person at an endpoint 16, or both, where appropriate. Reference to a "CPG" may include a CPG, a hunt group, or both, where appropriate. CPG functionality may be different from shared-line functionality. In particular embodiments, according to CPG functionality, when communication network 12 receives an incoming phone call to a phone number corresponding to a CPG, communication network 12 does not present the incoming phone call to all users in the CPG for pickup, but may nonetheless communicate data to all users in the CPG, as described below. In contrast, according to shared-line functionality, an incoming phone call on a shared line may be presented to all users coupled to the shared line. In particular embodiments, a person may be at different endpoints 16 at different times. In addition, a person may be at multiple endpoints 16 at the same time.

Communication network 12a includes a call control unit 20 providing enhanced CPG functionality in communication network 12a, as described below. Although call control unit 20 is described as providing enhanced CPG functionality in communication network 12a, the present invention contemplates call control unit 20 providing enhanced CPG functionality in any suitable communication network 12. As an example and not by way of limitation, call control unit 20 may provide enhanced CPG functionality in a communication network including communication networks 12a, 12b, and 12c. Call control unit 20 may include one or more hardware components, software components, or embedded-logic components or a combination of two or more such components providing enhanced CPG functionality, as described below. Call control unit 20 may be a stand-alone network device in communication network 12a. Call control unit 20 may be one of multiple components of a network device in communication network 12a. Call control unit 20 may access call data 22 to provide enhanced CPG functionality, as further described below.

In particular embodiments, when an incoming phone call is presented to a CPG for pickup, call control unit 20 may access call data 22 associated with the CPG and communicate that data to one or more users in the CPG. Call data 22 associated with a CPG may include data identifying one or more users in the CPG, data indicating whether one or more users in the CPG are available, data indicating a current presence status of each one or more users in the CPG, data indicating a current call status of each of one or more users in the CPG, data indicating a willingness of each of one or more users in the CPG to pick up an incoming phone call, other data, or a combination of such data. Data indicating a current presence status of a user may identify one or more endpoints 16 that the user is currently present at. A current presence status of a user may be determined using any suitable technique. As an example and not by way of limitation, in particular embodiments, proximity of a user to an endpoint 16 (such as a phone) may be used to determine whether the user is present at endpoint 16. Such proximity may be determined using a radio-frequency (RFID) tag in an employee badge of the user. Data indicating a current call status of a user may indicate whether the user is currently on a phone call.

As an example and not by way of limitation, in particular embodiments, when an incoming phone call is presented to a CPG for pickup, call control unit 20 may access call data 22 identifying all users in the CPG and communicate that data to one or more users in the CPG. As another example, in particular embodiments, when an incoming phone call is presented to a CPG for pickup, call control unit 20 may access call data 22 identifying all users in the CPG that are currently available and communicate that data to one or more users in the CPG.

As another example, in particular embodiments, when an incoming phone call is presented to a CPG for pickup, call control unit 20 may access call data 22 indicating a current call status of each user in the CPG and communicate that data to one or more users in the CPG for display. That data may inform a user in the CPG who is considering whether to pick up the incoming phone call how many other users in the CPG are currently on other phone calls. That data may also inform a user in the CPG who is considering whether to pick up the incoming phone call how many other users in the CPG are not currently on other phone calls and are therefore available to pick up the incoming phone call. If no other users in the CPG are available to pick up the incoming phone call, the user in the CPG who is considering whether to pick up the incoming phone call may pick up the incoming phone call in response to no other users in the CPG being available to pick up the incoming phone call. In particular embodiments, if only one user in the CPG is available to pick up the incoming phone call, call control unit 20 may communicate one or more alerts to that user prompting that user to pick up the incoming phone call. In particular embodiments, if no users in the CPG are available to pick up the incoming phone call, call control unit 20 may communicate one or more alerts to one or more users in the CPG to prompt those users to conclude the phone calls those users are currently on so that one of those users can pick up the incoming phone call.

In particular embodiments, if bandwidth is currently unavailable to transfer the incoming phone call to a first user in the CPG who is otherwise available to pick up the incoming phone call, call control unit 20 may notify one or more second users in the CPG that, because of current bandwidth limitations, the first user cannot pickup the incoming phone call. As an example and not by way of limitation, the first user may be coupled to a first LAN, the second users may be coupled to a second LAN, and the incoming phone call may have been received at the second LAN. One or more network links 14 may couple the first and second LANs to each other, and bandwidth across network links 15 may be unable to accommodate transfer of the incoming phone call from the second LAN to the first LAN. In response to the bandwidth limitation between the first and second LANs, call control unit 20 may notify the second users in the CPG coupled to the second LAN that, because of the bandwidth limitation between the first and second LANs, the first user cannot pickup the incoming phone call.

As another example, in particular embodiments, when an incoming phone call is presented to a CPG for pickup, call control unit 20 may access call data 22 indicating a current presence status of each user in the CPG and communicate that data to one or more users in the CPG. As an example and not by way of limitation, an incoming phone call may be presented to a CPG including users A, B, and C for pickup. Call control unit 20 may access call data 22 indicating that user A is currently present at a first endpoint 16, user B is currently present at a second endpoint 16, and user C is currently present at a third endpoint 16. Call control unit 20 may communicate that data to first, second, and third endpoint 16, and the presence data may be displayed at first, second, and third endpoints 16 for users A, B, and C. Users A, B, and C may determine from the presence data whether user A, user B, or user C should pick up the incoming phone call. As an example and not by way of limitation, first and second endpoints 16 may be mobile phones and third endpoint 16 may be a desktop phone. Users A, B, and C may determine that, because users A and B are at mobile phones and user C is at a desktop phone, user C should pick up the incoming phone call. Although call control unit 20 is described as accessing and communicating to users particular call data 22, the present invention contemplates call control unit 20 accessing and communicating to users any suitable call data 22.

In particular embodiments, a user in a CPG may indicate that the user is unavailable to pick up an incoming phone call. As an example and not by way of limitation, the user may be present at an endpoint 16 that includes a button or other device for indicating that the user is unavailable to pick up the incoming phone call. When an incoming phone call is presented to the CPG for pickup, the user may press the button and, in response to the user pressing the button, endpoint 16 may communicate to call control unit 20 the unavailability of the user to pick up the incoming phone call. Call control unit 20 may then communicate to other users in the CPG the unavailability of the user to pick up the incoming phone call.

In particular embodiments, a user in a CPG may indicate that the user would rather not pick up an incoming phone call. As an example and not by way of limitation, the user may be present at an endpoint 16 that includes a button or other device for indicating that the user would rather not pick up the incoming phone call. When an incoming phone call is presented to the CPG for pickup, the user may press the button and, in response to the user pressing the button, endpoint 16 may communicate to call control unit 20 the fact that the user would rather not pick up the incoming phone call. Call control unit 20 may then communicate to other users in the CPG the fact that the user would rather not pick up the incoming phone call.

In particular embodiments, a user in a CPG may indicate that the user will pick up an incoming phone call. As an example and not by way of limitation, the user may be present at an endpoint 16 that includes a button or other device for indicating that the user will pick up the incoming phone call. Such an indication may include, "Let it ring. I am taking this call." When an incoming phone call is presented to the CPG for pickup, the user may press the button and, in response to the user pressing the button, endpoint 16 may communicate to call control unit 20 the fact that the user will pick up the incoming phone call. Call control unit 20 may then communicate to other users in the CPG the fact that the user will pick up the incoming phone call, and, as a result, other users in the CPG may refrain from picking up the incoming phone.

As an example and not by way of limitation, consider a CPG including users A, B, C, and D. User A is located in a first building, user B is located in a second building, user C is located in a third building, and user D is located in a fourth building. As a result of users A, B, C, and D being separated from each other, none of users A, B, C, and D can determine whether another user is available to pick up an incoming phone call by simply looking over at a workstation of the other user. In one scenario, according to previous, unenhanced CPG functionality, if an incoming phone call is presented to the CPG for pickup when user A is the only user in the CPG available to pick up the incoming phone call, the incoming phone call may go unanswered if user A is busy and would rather not pick up the incoming phone call. In another scenario, according to previous, unenhanced CPG functionality, if an incoming phone call is presented to the CPG for pickup when user A is on a current phone call and users B, C, and D are each available to pick up the incoming phone call, user A may needlessly discontinue the current phone call and pick up the incoming phone call if the incoming phone call is important.

In contrast to previous, unenhanced CPG functionality, in particular embodiments, when an incoming phone call is presented to the CPG for pickup, call control unit 20 may communicate an INVITE message to user A using Session Initiation Protocol (SIP). The INVITE message may include a Multipurpose Internet Mail Extension (MIME) indicating Extensible Markup Language (XML) data identifying other users in the CPG who are available to pick up the incoming phone call and indicating a current call status of each of the other users who are available to pick up the incoming phone call (such as "handling a call," "idle," or "do not disturb"). As an example and not by way of limitation, if users A and B are each available to pick up the incoming phone call but currently on a phone call, user C is available to pick up the incoming phone call and not currently on a phone call, and user D is unavailable to pick up the incoming phone call, the INVITE message to user A may include essentially the following:

```
INVITE sip: UserA-phone@cisco.com SIP/2.0
From: group-pickup.callcenter.cisco.com
To: group-pickup-focus1.callcenter.cisco.com
Call-ID: 124235ASFDE3
Cseq: 1 INVITE
Allow: INVITE, ACK, BYE, CANCEL, INFO, NOTIFY, OPTIONS
Accept-Language: en
Content-Type: application/Cisco-cap+xml
<?xml version="1.0" encoding ="UTF-8"?>
<AvailableUsers>
<Total>3</Total>
<User>
<Name>UserA</Name>
<Status>Busy</Status>
</User>
<User>
<Name>UserB</Name>
<Status>Busy</Status>
</User>
<User>
<Name>UserC</Name>
<Status>Idle</Status>
</User>
</ AvailableUsers>
```

The above INVITE message is only an example and does not necessarily represent an actual SIP INVITE message. Contents of the INVITE message may be displayed to user A at an endpoint 16. From the display, user A may determine that, because user C is available and idle, user A need not discontinue the phone call user A is currently on. In particular embodiments, contents of the INVITE message are authored and displayed using a user-friendly graphical user interface (GUI).

In particular embodiments, when an incoming phone call is presented to a CPG for pickup, call control unit 20 automatically accesses call data 22 associated with the CPG and communicates that data to one or more users in the CPG. As an alternative, in particular embodiments, instead of call control unit 20 pushing call data 22 associated with the CPG out to users in the CPG, users in the CPG may pull call data 22 associated with the CPG from call control unit 20. As an example and not by way of limitation, when an incoming phone call is presented to a CPG for pickup, call control unit 20 may communicate an INVITE message to one or more users in the CPG that does not include call data 22 associated with the CPG. A user in the CPG may receive the INVITE message and, in response to the INVITE message, subscribe to a CPG buddy list to receive call data 22 associated with the CPG from call control unit 20. In response to the user subscribing to the CPG buddy list, call control unit 20 may communicate that data to the user.

FIG. 2 illustrates an example display 24 of example call data 22 associated with a CPG for enhanced call pickup. Although a particular display 24 of particular call data 22 associated with a particular CPG is illustrated and described, the present invention contemplates any suitable display 24 of any suitable call data 22 associated with any suitable CPG. Although data in display 24 is illustrated and described as being displayed according to a particular arrangement, the present invention contemplates data in display 24 being displayed according to any suitable arrangement. In particular embodiments, an endpoint 16 may generate one or more portions of display 24 using call data 22 from call control unit 20. In particular embodiments, call control unit 20 may generate one or more portions of display 24 and communicate those generated portions of display 24 to endpoint 16 for display at endpoint 16.

Display 24 illustrated in FIG. 2 has been generated in response to an incoming phone call from 214.638.6312 to 972.543.1058. The called phone number corresponds to a CPG designated "CPG 1058." CPG 1058 includes users S. Shaffer, S. Sarkar, L. Patel, and C. Fitzgerald. Display 24 has been presented to C. Fitzgerald at an endpoint 16 that C. Fitzgerald is currently present at. From display 24, C. Fitzgerald may ascertain that S. Shaffer is in his office, available to pick up the incoming phone call, and currently on a phone call and would rather not pick up the incoming phone call; S. Sarkar is outside his office at an unknown location, available to pick up the incoming phone call, present at a mobile phone, and not currently on a phone call; and L. Patel is outside his office at a location designated "Conference Room 415," available to pick up the incoming phone call, present at a desktop phone, and not currently on a phone call. If C. Fitzgerald is in his office and not currently on a phone call, C. Fitzgerald may decide to pick up the incoming phone call, since he is in the best position of the users in the CPG to pick up the incoming phone call. In particular embodiments, display 24 may be presented to C. Fitzgerald at endpoint 16 before the incoming phone call is picked up. In particular embodiments, display 24 may be terminated at endpoint 16 when the incoming phone call is picked up. In particular embodiments, display 24 may remain visible at endpoint 16 for a predetermined or other amount of time after the incoming phone call has been picked up.

Although a centralized call control unit 20 and centralized call data 22 are illustrated and described as providing enhanced CPG functionality, the present invention also contemplates distribution of enhanced CPG functionality. As an example and not by way of limitation, in particular embodiments, endpoints 16 at which users in a CPG are currently present may communicate call data 22 associated with the CPG directly to each other in response to an incoming phone call being presented to the CPG for pickup.

FIG. 3 illustrates an example method for enhanced call pickup. The method begins at step 100, where communication network 12*a* receives an incoming phone call to a phone number corresponding to a CPG of communication network 12*a*. At step 102, communication network 12*a* presents the incoming phone call to one or more users in the CPG at one or more endpoints 16 for pickup. At step 104, call control unit 20 accesses call data 22 associated with the CPG. At step 106, call control unit 20 communicates at least some of that data to one or more users in the CPG at one or more endpoints 16. As described above, call control unit 20 may automatically access call data 22 associated with the CPG and communicate that data to one or more users in the CPG in response to the incoming phone call being presented to the CPG for pickup. In addition or as an alternative, as further described above, call control unit 20 may access call data associated with the CPG and communicate that data to a user in the CPG in response to a request for that data from the user.

At step 108, one or more displays 24 of call data 22 associated with the CPG are presented to one or more users in the CPG at one or more endpoints 16. At step 110, one or more users in the CPG view one or more displays 24 of call data 24 associated with the CPG at one or more endpoints 16. Displays 24 enable users in the CPG to each make an informed decision regarding whether to pick up the incoming phone call. In addition, displays 24 may enable users in the CPG to communicate with each other regarding the incoming phone call, as described above. At step 112, a user in the CPG picks up the incoming phone call. At step 114, displays 14 are terminated, at which point the method ends. Although the steps of the method illustrated in FIG. 3 are described and illustrated as occurring in a particular order, the present invention contemplates any suitable steps of the method illustrated in FIG. 3 occurring in any suitable order.

Although the present invention has been described with several embodiments, myriad changes, variations, alterations, transformations, and modifications may be suggested to one skilled in the art, and it is intended that the present invention encompass such changes, variations, alterations, transformations, and modifications as fall within the scope of the appended claims. The present invention is not intended to be limited, in any way, by any statement in the specification that is not reflected in the claims.

What is claimed is:

1. A system for enhanced call pickup, the system comprising one or more processing units collectively operable to:
   receive an incoming phone call directed to a particular user of a plurality of users associated with a call pickup group (CPG);
   access data indicating a current status of each of the plurality of users in the CPG in response to the incoming phone call; and
   communicate the status of each of the plurality of users in the CPG to one or more endpoints of each of the plurality of users in the CPG for display to each of the plurality of users in the CPG, displaying the data to a first user in the CPG for the first user to determine a current status of each of the plurality of users in the CPG to facilitate a decision by the first user regarding whether to pick up the incoming phone call directed to the particular user, wherein data indicating a current status of each of the plurality of users in the CPG comprises at least:
   data indicating a bandwidth limitation preventing transfer of the incoming phone call to one or more users in the CPG, wherein bandwidth is available for one or more other users in the CPG to pick up the incoming phone call; and
   data indicating a preference of each user with respect to picking up the incoming phone call.

2. The system of claim 1, wherein data indicating a current status of each of the plurality of users in the CPG further comprises one or more of:
   data identifying each user;
   data indicating a current availability of each user;
   data indicating a current presence status of each user;
   data indicating a current call status of each user; and
   data indicating whether any user intends to pick up the incoming phone call.

3. The system of claim 1, wherein the CPG comprises a hunt group.

4. The system of claim 1, wherein the one or more processing units are collectively operable to automatically and without user input access and communicate the data in response to the incoming phone call.

5. The system of claim 1, wherein the one or more processing units are collectively operable to access the data and communicate the data to the first user in the CPG in response to a request for the data from the first user.

6. The system of claim 1, wherein the one or more processing units are collectively operable to:
   receive input from the first user in the CPG comprising one or more of:
      a first indication of a preference of the first user with respect to picking up the incoming phone call; and
      a second indication of whether the first user intends to pick up the incoming phone call; and
   communicate the input from the first user to one or more endpoints of each of the plurality of users in the CPG for display to the plurality of users in the CPG, a display of the input from the first user facilitating a second user determining a current status of the first user to facilitate a decision by the second user regarding whether to pick up the incoming phone call directed to the particular user.

7. The system of claim 1, wherein the one or more processing units are operable to communicate with one or more endpoints of each of the plurality of users in the CPG using Session Initiation Protocol (SIP).

8. The system of claim 1, further comprising the one or more endpoints of each of the plurality of users in the CPG, each of the endpoints being operable to receive the data from the one or more processing units and display the data to a respective user in the CPG.

9. The system of claim 1, wherein any user communicates its current status using one or more of a graphical user interface (GUI) and a button at a respective endpoint.

10. The system of claim 1, wherein the one or more processing units are operable to select one of a plurality of pregenerated messages conveying a call status of each user and communicate the selected message to indicate the call status of each user.

11. A method for enhanced call pickup, the method comprising:

receiving an incoming phone call directed to a particular user of a plurality of users associated with a call pickup group (CPG);

accessing data indicating a current status of each of the plurality of users in the CPG in response to the incoming phone call; and communicating the status of each of the plurality of users in the CPG to one or more endpoints of each of the plurality of users in the CPG for display to each of the plurality of users in the CPG, displaying the data to a first user in the CPG for the first user to determine a current status of each of the plurality of users in the CPG to facilitate a decision by the first user regarding whether to pick up the incoming phone call directed to the particular user, wherein data indicating a current status of each of the plurality of users in the CPG comprises at least:

data indicating a bandwidth limitation preventing transfer of the incoming phone call to one or more users in the CPG, wherein bandwidth is available for one or more other users in the CPG to pick up the incoming phone call; and data indicating a preference of each user with respect to picking up the incoming phone call.

12. The method of claim 11, wherein data indicating a current status of each of the plurality of users in the CPG further comprises one or more of:

data identifying each user;
data indicating a current availability of each user;
data indicating a current presence status of each user;
data indicating a current call status of each user; and
data indicating whether any user intends to pick up the incoming phone call.

13. The method of claim 11, wherein the CPG comprises a hunt group.

14. The method of claim 11, comprising automatically and without user input accessing and communicating the data in response to the incoming phone call.

15. The method of claim 11, comprising accessing the data and communicating the data to the first user in the CPG in response to a request for the data from the first user.

16. The method of claim 11, further comprising:

receiving input from the first user in the CPG comprising one or more of:
a first indication of a preference of the first user with respect to picking up the incoming phone call; and
a second indication of whether the first user intends to pick up the incoming phone call; and communicating the input from the first user to one or more endpoints of each of the plurality of users in the CPG for display to the plurality of users in the CPG, a display of the input from the first user facilitating a second user determining a current status of the first user to facilitate a decision by the second user regarding whether to pick up the incoming phone call directed to the particular user.

17. The method of claim 11, comprising communicating with one or more endpoints of each of the plurality users in the CPG using Session Initiation Protocol (SIP).

18. The method of claim 11, further comprising receiving the data and displaying the data to each user in the CPG.

19. The method of claim 11, wherein any user communicates its current status using one or more of a graphical user interface (GUI) and a button at a respective endpoint.

20. The method of claim 11, comprising selecting one of a plurality of pregenerated messages conveying a call status of each user and communicate the selected message to indicate the call status of each user.

21. Computer-readable medium encoded with software for enhanced call pickup, the software when executed operable to:

receive an incoming phone call directed to a particular user of a plurality of users associated with a call pickup group (CPG);

access data indicating a current status of each of the plurality of users in the CPG in response to the incoming phone call; and communicate the status of each of the plurality of users in the CPG to one or more endpoints of each of the plurality of users in the CPG for display to each of the plurality of users in the CPG, displaying the data to a first user in the CPG for the first user to determine a current status of each of the plurality of users in the CPG to facilitate a decision by the first user regarding whether to pick up the incoming phone call directed to the particular user, wherein data indicating a current status of each of the plurality of users in the CPG comprises at least:

data indicating a bandwidth limitation preventing transfer of the incoming phone call to one or more users in the CPG, wherein bandwidth is available for one or more other users in the CPG to pick up the incoming phone call; and data indicating a preference of each user with respect to picking up the incoming phone call.

22. The computer-readable medium of claim 21, wherein data indicating a current status of each of the plurality of users in the CPG further comprises one or more of:

data identifying each user;
data indicating a current availability of each user;
data indicating a current presence status of each user;
data indicating a current call status of each user; and
data indicating whether any user intends to pick up the incoming phone call.

23. The computer-readable medium of claim 21, wherein the CPG comprises a hunt group.

24. The computer-readable medium of claim 21, operable to automatically and without user input access and communicate the data in response to the incoming phone call.

25. The computer-readable medium of claim 21, operable to access the data and communicate the data to the first user in the CPG in response to a request for the data from the first user.

26. The computer-readable medium of claim 21, operable to:

receive input from the first user in the CPG comprising one or more of:
a first indication of a preference of the first user with respect to picking up the incoming phone call; and
a second indication of whether the first user intends to pick up the incoming phone call; and communicate the input from the first user to one or more endpoints of each of the plurality of users in the CPG for display to the plurality of users in the CPG, a display of the input from the first user facilitating a second user determining a current status of the first user to facilitate a decision by the second user regarding whether to pick up the incoming phone call directed to the particular user.

27. The computer-readable medium of claim 21, operable to communicate with one or more endpoints of each of the plurality users in the CPG using Session Initiation Protocol (SIP).

28. The computer-readable medium of claim 21, further operable to receive the data and display the data to each user in the CPG.

29. The computer-readable medium of claim 21, wherein any user communicates its current status using one or more of a graphical user interface (GUI) and a button at a respective endpoint of the user.

30. The computer-readable medium of claim 21, operable to select one of a plurality of pregenerated messages conveying a call status of each user and communicate the selected message to indicate the call status of each user.

31. A system for enhanced call pickup, the system comprising one or more processing units collectively operable to:
in response to an incoming phone call directed to a particular user of a plurality of users of a call pickup group (CPG), automatically and without user input:
  access data indicating a current status of each of the plurality of users in a CPG in response to the incoming phone call directed to the particular user, the data comprising at least:
    data identifying each user;
    data indicating a current availability of each user;
    data indicating a current presence status of each user;
    data indicating a bandwidth limitation preventing transfer of the incoming phone call to one or more users in the CPG, wherein bandwidth is available for one or more other users in the CPG to pick up the incoming phone call; and
    data indicating a current call status of each user;
  using Session Initiation Protocol (SIP), communicate the status of each of the plurality of users in the CPG to one or more endpoints of each of the plurality of users in the CPG for display to the plurality of users in the CPG, displaying the data to a first user in the CPG for the first user to determine a current status of each of the plurality of users in the CPG to facilitate a decision by the first user regarding whether to pick up the incoming phone call directed to the particular user;
  using SIP, receive input from the first user in the CPG comprising one or more of:
    a first indication of a preference of the first user with respect to picking up the incoming phone call; and
    a second indication of whether the first user intends to pick up the incoming phone call; and
  using SIP, communicate the input from the first user to one or more endpoints of each of the plurality of users in the CPG for display to the plurality of users in the CPG, a display of the input from the first user facilitating a second user determining a current status of the first user to facilitate a decision by the second user regarding whether to pick up the incoming phone call directed to the particular user.

32. A system for enhanced call pickup, the system comprising:
means for receiving an incoming phone call directed to a particular user of a plurality of users associated with a call pickup group (CPG);
means for accessing data indicating a current status of each of the plurality of users in the CPG in response to the incoming phone call; and
means for communicating the status of each of the plurality of users in the CPG to one or more endpoints of each of the plurality of users in the CPG for display to each of the plurality of users in the CPG, displaying the data to a first user in the CPG for the first user to determine a current status of each of the plurality of users in the CPG to facilitate a decision by the first user regarding whether to pick up the incoming phone call directed to the particular user, wherein data indicating a current status of each of the plurality of users in the CPG comprises at least:
  data indicating a bandwidth limitation preventing transfer of the incoming phone call to one or more users in the CPG, wherein bandwidth is available for one or more other users in the CPG to pick up the incoming phone call; and
  data indicating a preference of each user with respect to picking up the incoming phone call.

* * * * *